(12) United States Patent
Prueitt (10) Patent No.: US 7,975,686 B2
(45) Date of Patent: Jul. 12, 2011

(54) HIGH LEVERAGE TROUGH SOLAR COLLECTOR

(76) Inventor: Melvin L. Prueitt, Los Alamos, NM (US)

( * ) Notice: Subject to any disclaimer, the term of this patent is extended or adjusted under 35 U.S.C. 154(b) by 0 days.

(21) Appl. No.: 12/574,955

(22) Filed: Oct. 7, 2009

(65) Prior Publication Data

US 2010/0018520 A1 Jan. 28, 2010

Related U.S. Application Data

(63) Continuation-in-part of application No. 11/696,854, filed on Apr. 5, 2007.

(51) Int. Cl.
*F24J 2/12* (2006.01)

(52) U.S. Cl. ........ 126/694; 126/600; 126/569; 126/680; 126/684; 126/607

(58) Field of Classification Search .................. 126/600, 126/684, 692, 696, 694, 704, 709; 136/246
See application file for complete search history.

(56) References Cited

U.S. PATENT DOCUMENTS

| | | | | | |
|---|---|---|---|---|---|
| 1,111,239 | A | * | 9/1914 | Smelser | 359/853 |
| 1,162,505 | A | * | 11/1915 | Nichols | 126/604 |
| 3,923,381 | A | | 12/1975 | Winston | |
| 4,000,734 | A | * | 1/1977 | Matlock et al. | 126/576 |
| 4,011,858 | A | * | 3/1977 | Hurkett | 126/605 |
| 4,030,102 | A | * | 6/1977 | Kaplan et al. | 343/915 |
| 4,038,971 | A | * | 8/1977 | Bezborodko | 126/606 |
| 4,078,549 | A | * | 3/1978 | McKeen et al. | 126/606 |
| 4,108,154 | A | * | 8/1978 | Nelson | 126/576 |
| 4,114,594 | A | * | 9/1978 | Meyer | 126/606 |
| 4,135,493 | A | * | 1/1979 | Kennedy | 126/577 |
| 4,136,671 | A | * | 1/1979 | Whiteford | 126/654 |
| 4,149,523 | A | * | 4/1979 | Boy-Marcotte et al. | 126/589 |
| 4,205,659 | A | * | 6/1980 | Beam | 126/578 |
| 4,240,406 | A | * | 12/1980 | Hutchison | 359/867 |
| 4,245,616 | A | * | 1/1981 | Wyland | 126/579 |
| 4,273,104 | A | * | 6/1981 | Uroshevich | 126/652 |
| 4,413,618 | A | * | 11/1983 | Pitts et al. | 126/684 |
| 4,432,343 | A | * | 2/1984 | Riise et al. | 126/602 |
| 4,455,833 | A | * | 6/1984 | Tiboldi | 60/641.15 |
| 4,469,938 | A | * | 9/1984 | Cohen | 250/203.4 |
| 4,546,757 | A | * | 10/1985 | Jakahi | 126/604 |
| 4,559,926 | A | * | 12/1985 | Butler | 126/578 |

(Continued)

FOREIGN PATENT DOCUMENTS

CH 654 627 A5 * 6/1981

(Continued)

*Primary Examiner* — Steven B McAllister
*Assistant Examiner* — Desmond Peyton (57) ABSTRACT

This invention is a trough solar collector that uses the principles of high leverage in order to produce a lightweight, inexpensive thermal solar collector. The parabolic reflectors are held in proper shape by rigid ribs that are spaced apart along the length of the collector. The structure of the trough is held rigid by a unique sun-tracking system that not only guides a long trough row to point it toward the sun, but also maintains the whole length of the row in rigid configuration. Small-diameter cables are wrapped around a rotatable pipe that extends along the row. The cables extend around circular arches attached to the parabolic ribs that provide high leverage for rotating the troughs. Since the arches rotate in unison, the long trough row is maintained in rotational rigidity. Rather than having heavy concrete foundations and heavy structures to support the troughs, lightweight support posts are placed into the ground, and guy wires maintain the position of the posts.

11 Claims, 8 Drawing Sheets

U.S. PATENT DOCUMENTS

| | | | | |
|---|---|---|---|---|
| 4,596,238 A * | 6/1986 | Bronstein | ............... | 126/684 |
| 4,611,575 A * | 9/1986 | Powell | ............... | 126/605 |
| 4,968,355 A * | 11/1990 | Johnson | ............... | 136/246 |
| 5,058,565 A * | 10/1991 | Gee et al. | ............... | 126/570 |
| 5,071,243 A * | 12/1991 | Bronstein | ............... | 359/867 |
| 5,191,876 A * | 3/1993 | Atchley | ............... | 126/576 |
| 5,325,844 A * | 7/1994 | Rogers et al. | ............... | 126/605 |
| 5,404,868 A * | 4/1995 | Sankrithi | ............... | 126/604 |
| 6,057,504 A * | 5/2000 | Izumi | ............... | 136/246 |
| 6,302,099 B1 * | 10/2001 | McDermott | ............... | 126/600 |
| 6,676,263 B2 | 1/2004 | Winston | | |
| 6,832,608 B2 * | 12/2004 | Barkai et al. | ............... | 126/653 |
| 2002/0179138 A1 * | 12/2002 | Lawheed | ............... | 136/246 |
| 2005/0225885 A1 * | 10/2005 | Wright | ............... | 359/871 |
| 2006/0150967 A1 * | 7/2006 | Hoelle et al. | ............... | 126/694 |
| 2008/0289334 A1 * | 11/2008 | Orosz et al. | ............... | 60/641.8 |
| 2008/0308094 A1 * | 12/2008 | Johnston | ............... | 126/694 |
| 2009/0056701 A1 * | 3/2009 | Mills et al. | ............... | 126/606 |
| 2009/0183731 A1 * | 7/2009 | Capan | ............... | 126/605 |
| 2010/0258186 A1 * | 10/2010 | Harrenstien et al. | ............... | 136/259 |

FOREIGN PATENT DOCUMENTS

EP     373234 A1 *    6/1990

* cited by examiner

HIGH LEVERAGE TROUGH SOLAR COLLECTOR

CROSS-REFERENCE TO RELATED APPLICATION

This application is a Continuation-in-Part of my co-pending U.S. patent application Ser. No. 11/696,854, with the title "Thin Film Trough Solar Collector," filed Apr. 5, 2007, the entire contents of which are incorporated herein by reference.

BACKGROUND OF THE INVENTION

Regular parabolic trough solar collectors are typically built with rugged structural members to provide rigidity so that when one part of the trough is rotated by a sun-tracking mechanism, the whole trough rotates together. The parabolic reflectors are typically glass or highly polished metal. U.S. Pat. Nos. 4,114,594 and 5,058,565 show trough structures that can be rotated by external means, but the troughs have to be rotationally rigid.

The rigid structures of these troughs are expensive, and the reflecting surfaces are expensive.

The tubes that carry the cooling fluid are typically located somewhat above the parabolic reflector. These designs are typically quite sensitive to the accuracy of the sun-tracking system. That is, if the troughs are not pointed fairly accurately toward the sun, the reflected rays tend to miss the target (the pipe carrying the cooling fluid). U.S. Pat. Nos. 3,923,381 and 6,676,263 overcome this problem by having a fairly narrow channel for concentrating the sunrays, and the fluid pipe is located deep within the cavity. These troughs also require rigid and expensive structures to maintain the geometry of the troughs.

SUMMARY OF THE INVENTION

This invention, called "Suntrof" herein, is a design for a solar trough collector which has the target fluid pipe deep within the cavity formed by a parabolic reflector. The reflector is an aluminized plastic film or other flexible reflective material, which is held in place by being stretched horizontally (longitudinally) between rigid ribs and cemented to the inside of the ribs. A protective sheet of tough plastic film is cemented to the outside of the ribs to prevent wind from hitting the reflective film. The ribs can be metal or fiber-reinforced plastic and can be molded in a factory inexpensively.

Since many of the aluminized plastic films have high tensile strength, if a sheet of the film is stretched tightly between two curved ribs, the film between the ribs will have a strong tendency to maintain the same curvature as the ribs over the whole length of the film. The tension of the sheet is transmitted from rib to rib until the sheet reaches the end of the trough, where the force of the tension is countered by a rigid end framework. By this means, the ribs do not have to sustain any large lateral or longitudinal forces.

One of the main features of the Suntrof structure is the concept that rigidity of the trough is provided mainly by the sun-tracking system. By having a set of sun-tracking cables connected to the tops of a set of troughs on a field, rigidity is provided, and all parts of each trough are pointed toward the sun. The cables are attached to tracking pipes at the east and west sides of the field, which rotate to cause the cables to move east and west and thus move the troughs east and west to track the sun. In this sense, it is similar to the tracking method presented in the U.S. patent application No. 60/648,865, "Solar Power Concentrator Using Reflective Films" by the present inventor. That system goes by the acronym of "Suncone." The tracking system of Suncone is similar to the one presented here, except that Suncone has a two-axis tracking, while Suntrof has single axis tracking. But the major difference is that the Suntrof tracking system is designed to provide rigidity to the troughs, whereas the tracking system of Suncone does not provide rigidity to the reflective surface geometries.

Since the troughs are held in place by leverage of the cables from above, concrete foundations are not necessary, as they are with regular solar troughs and dishes. The Suntrof supports may simply be pipes driven into the ground.

The plastic film reflectors are much less expensive than glass or polished metal reflectors. Since strong metal beams are not required to provide the rigidity, additional expense is saved.

By having the fluid pipe down near the bottom of a fairly narrow trough, the system requires less tracking accuracy, and the cable tracking method will function properly.

It is therefore an object of the present invention to efficiently collect solar energy by a parabolic trough design that requires less sun-tracking accuracy than widely used parabolic troughs.

It is another object of the present invention to provide a method that utilizes inexpensive plastic films as parabolic reflectors in order to provide a less expensive method of collecting solar energy.

It is another object of the present invention to provide a sun-tracking system that not only causes a field of troughs to track the sun but also provides rigidity to the troughs without having to have heavy metal structures.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate embodiments of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
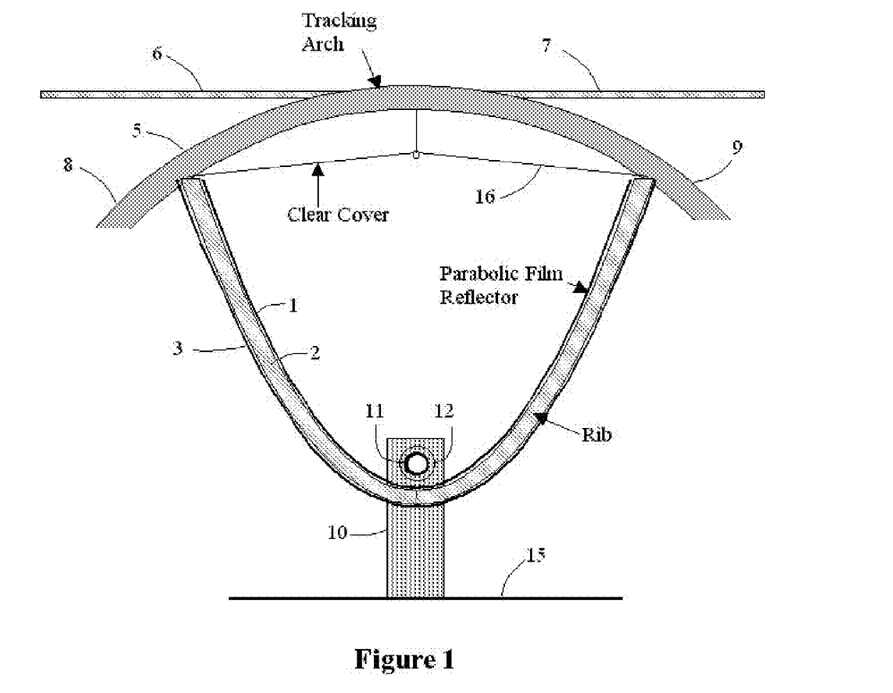
FIG. 1 is a cross-sectional end-view schematic of one embodiment of the present invention in which the ribs are shown supporting the reflective film and the outside protective film, and the trough is pointed toward the sun by cables connected to an arch above the trough.
Figure 2:
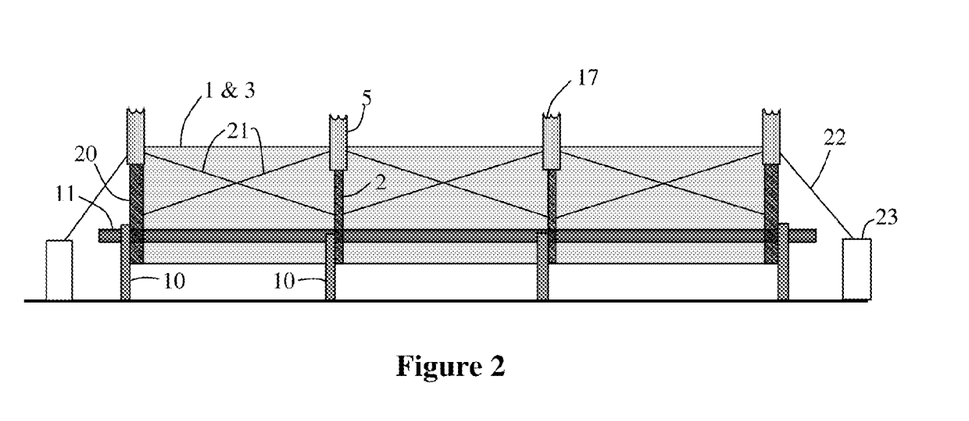
FIG. 2 is a side view of the trough showing the ribs with the tracking arches attached.

FIG. 1 is a schematic drawing of an end-view of the trough. FIG. 2 shows a side view of a short trough. Actually a trough may be quite long, and there may be many ribs distributed periodically along the trough.

An important feature of this invention is that the whole trough is held rigid by the tracking cable system. At first, one might think that a long trough system built with lightweight plastic components would tend to twist along its length. That is, parts of it would point in different directions. But the tracking cable system is attached to the tracking arch 5, and that provides it with a long lever arm that pivots about the fluid pipe 11. Even a small cable can hold the system rigid in windy conditions, due to the long lever arm. Archimedes said, "Give me a lever long enough and a fulcrum on which to place it, and I shall move the world." The ribs 2 and the tracking arches 5 form levers that rotate the trough from the top, rather than having the trough rotated from the bottom as with regular troughs and dishes.

In FIG. 1, trough 30 has the reflective film 1 that is supported by ribs 2. A protective enclosure 3, which can be a tough plastic film, is supported by cementing the film to the outside of the ribs. The tracking arch 5 is attached rigidly to the ribs. Cable 6 fits into a groove in the top of the arch and is connected at point 9 in the arch. Cable 7 fits into a second groove in the arch and is connected at point 8. With this design, as the cables move from side to side, the arch rolls and moves the trough with it.

The trough is supported by a support post 10. The support post also supports the fluid pipe 11 and the glass enclosure tube 12.

The trough is covered by a transparent cover 16 to prevent wind and dust from entering the trough. The cover is sealed to the protective enclosure film along the top sides.

FIG. 2 gives a schematic side view of the trough showing the relationship of the films 1 and 3, the ribs 2, the arches 5, the fluid pipe 11, and the support posts 10. It also shows diagonal guy wires 21 that help maintain the rigidity of the trough structure. The guy wires 22 provide support for the end frames 20. The guy wires 22 are attached to support structures 23 at a point that is in line with the center of rotation of the trough (the center of the fluid pipe 11).

The tracking arch 5 is a piece of rigid material that is a circular arc as though it were a portion of a rim of a wheel with its radius equal to the distance from the rim to the pivot line of the rotation of the collector. (The pivot line is the center of the fluid pipe). The tracking cables fit into grooves 17.

If the forces necessary to counter gravity and wind loads were provided by a pivot at the bottom of the trough (as it is with current dish and trough solar collectors) the structure would have to be very robust, and heavy gear boxes would be required to point the trough toward the sun.

Figure 3:
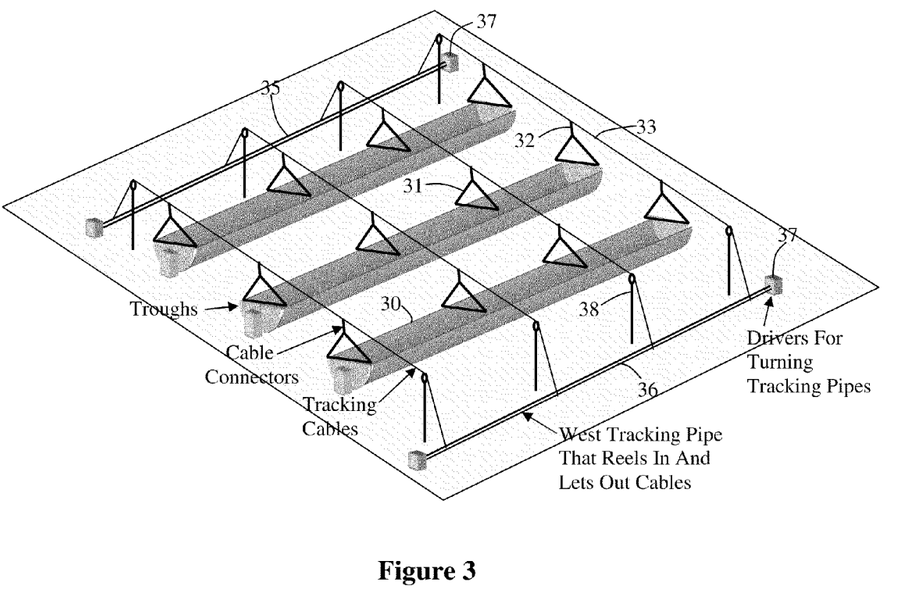
FIG. 3 is an isometric drawing that illustrates another embodiment of the present invention in which the operation of the tracking system uses a framework and a connecting rod to rotate all the troughs in a field toward the sun and provides rigidity to the troughs.

FIG. 3 illustrates another embodiment of the present invention. Rather than having arches for cable attachment, it has frame structures above the troughs that connect to the tracking cables. FIG. 3 is an isometric drawing showing the sun-tracking system consisting of cables 33, which are attached to connection rods 32 (cable connectors) that are held above the troughs 30 by frameworks 31. The cables 33 wrap around tracking pipes 35 and 36 on the east and west sides of the field, respectively. The tracking pipes are rotated by drivers 37. As the tracking pipes rotate, the cables, which are wrapped around the tracking pipes, are drawn in or let out. The tracking pipes act as reels. The cables form a single-layer wrap around the pipes. Poles 38 with pulleys on top provide support for the cables. Not shown are intermediate tracking pipe supports with bearings along the tracking pipes.

This method may be a little simpler than the arches, but it has the disadvantage that as the troughs point far to the east or west, the cables are pulled downward by their connections to connection rods 32. This would require that the tracking pipes on the east and west rotate at slightly different rates.

When the circular arches are used, the tracking pipes on the east and west would rotate at the same rate.

As the west tracking pipe rotates to pull on the cable and the east tracking pipe rotates to let the cable out, the troughs rotate to the west to follow the sun (in both the embodiments of FIGS. 1 and 3). If the cable connection point is six feet above the fluid pipe, the tracking pipe would need to draw in about 15 feet of cable (assuming the troughs go no lower than 20 degrees from the horizon). If quarter-inch cable is used and the tracking pipes are 4 inches in diameter, the cable would wrap around the pipe about 14 times, which means that the cable would occupy a distance of about 4 inches along the pipe when fully wound. We do not want the cable to be wrapped more than one layer in depth on the pipe. If it is wrapped more than one layer, the amount of draw during one revolution would be different on the second layer than on the first.

Figure 4:
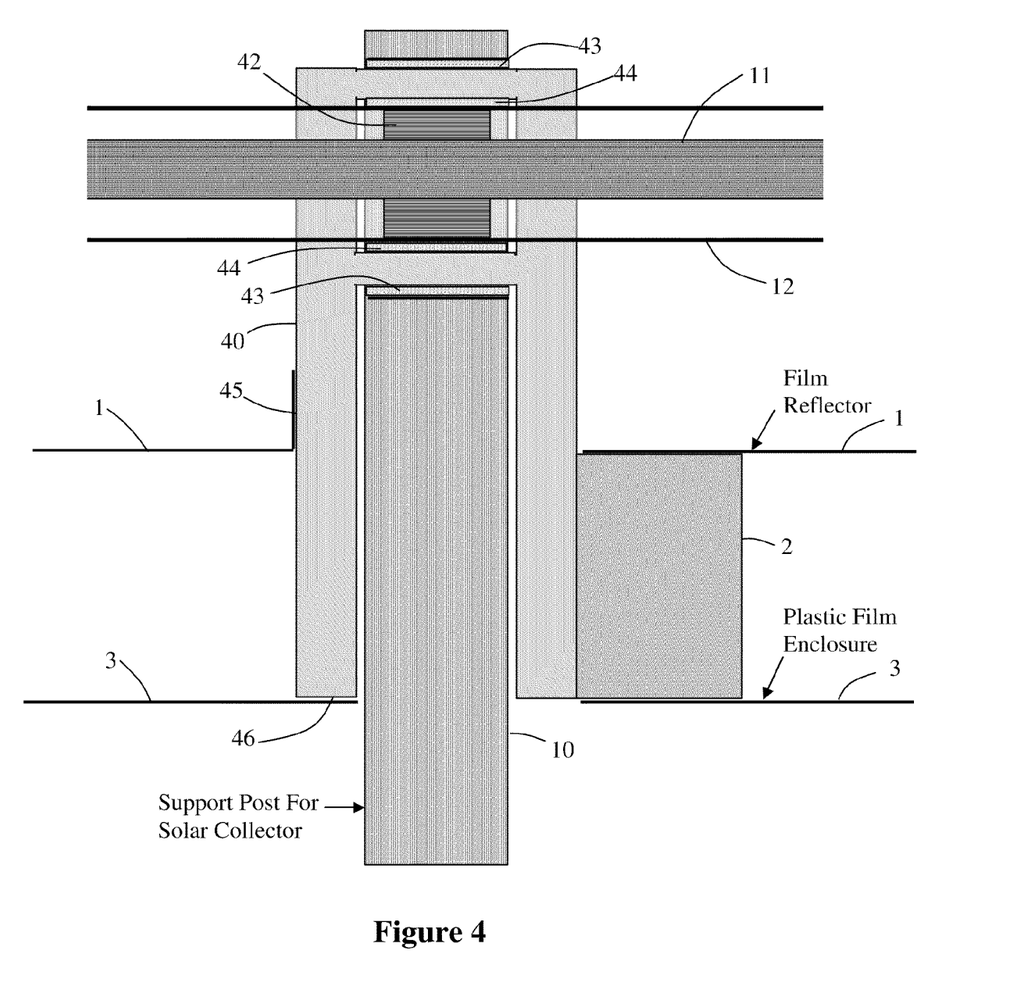
FIG. 4 is a schematic side view showing a method of having a support post hold up the fluid pipe and the trough components.

FIG. 4 is a side view schematic that shows a method of having the support posts 10 hold up the trough and the fluid pipe 11 and its glass enclosure tube 12. The support post holds up the connection assembly 40 by bearings 43, since the connection assembly must rotate. The rib 2 to which the plastic films 1 and 3 are attached is connected to the connection assembly 40. As the tracking system rotates the trough, the connection assembly rotates with the trough and the ribs. But the fluid pipe 11 and its glass enclosure tube 12 do not rotate. A hole from left to right through the top of the connection assembly provides a passage for the glass tube and the fluid pipe. Another bearing 44 allows the connection assembly to rotate as it supports the glass tube. A glass tube-pipe separator 42 between the pipe and glass tube provides support for the fluid pipe.

Note that the reflective film 1 and the enclosure film 3 approaching from the right are cemented to the rib. However, the support post must pass through the films in order to support the fluid pipe. That means that at the bottom, the films' continuity is interrupted by the penetration of the support post into the trough. The connection assembly affords a method of attaching the plastic films so that dust does not enter the trough. The reflective film 1 and the enclosure film 3 approaching from the left at the bottom are cemented to the connection assembly at points 45 and 46, respectively.

Figure 5:
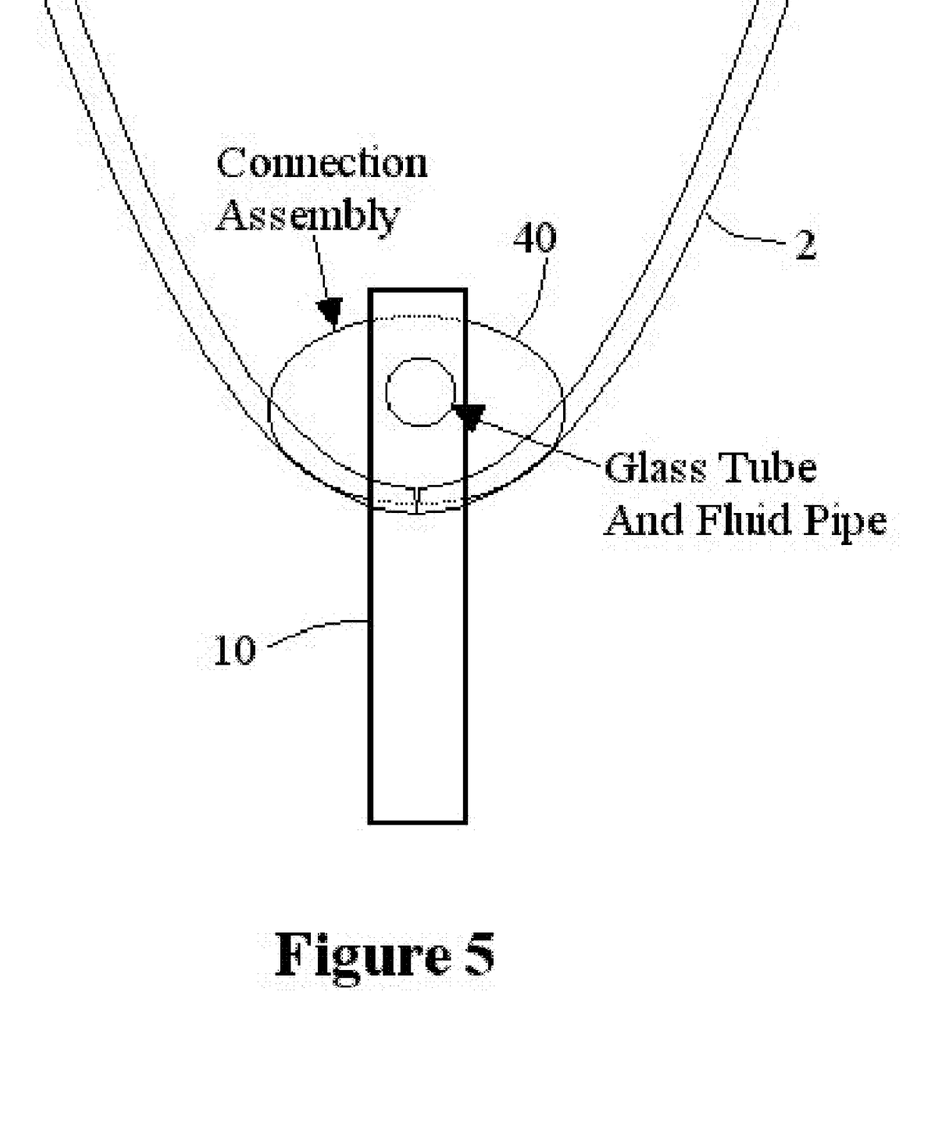
FIG. 5 is a schematic end view of the connection assembly construction of FIG. 4 showing its relationship to the support post and the rib. The bottom of the trough is open to allow the penetration of the support post, but the plastic films are cemented to the connection assembly in this area to prevent dust from entering the trough.

FIG. 5 shows an end view schematic of the relationship of the support post 10, the connection assembly 40, and the ribs 2.

Figure 6:
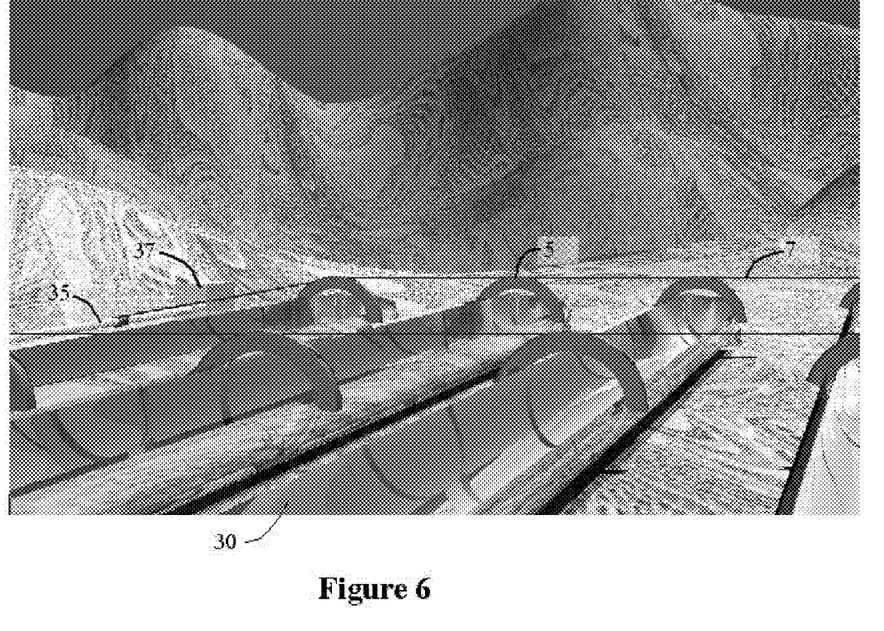
FIG. 6 is a perspective computer graphic image of a Suntrof array showing tracking cable connection to arches above the troughs.

FIG. 6 is a computer graphic image illustrating a field setup of some troughs of the embodiment shown in FIGS. 1 and 2. It has the arches 5 that connect the cables 7 to the troughs 30. The tracking pipe 35 and its driver 37 are shown in the distance.

Solar Collection Efficiency of Suntrof Compared to Other Solar Concentrators

Trough collectors have the disadvantage of losing efficiency during the winter due to the fact that the sun is low in the south (in the Northern Hemisphere), and the troughs do not rotate toward the south. On December 21 of each year in southern California, Arizona, and New Mexico, the sun is only about 34 degrees above the horizon at noon, which means that the solar collectors get only 56% as much solar energy as they would if the sunrays were perpendicular to the collectors' apertures. Solar parabolic dishes and Suncone collectors can rotate to the south to keep the sunrays perpendicular to the aperture.

The disadvantage of the dish collectors is that they have to be spaced apart in the north-south direction to prevent shadowing on each other in the winter. (All dish, trough, and Suncone collectors have to be spaced apart in the east-west direction). Consider a Suntrof collector that is 4 meters wide and 100 meters long. On December 21 at noon, it would be receiving 224 kilowatts of solar energy. A row of solar dishes lined up in a north-south row, each having a diameter of 4 meters, would need to have a north-south spacing of about 5.5 meters to reduce shadowing. Each dish would have an aperture of 12.57 square meters. If there were 19 dishes lined up along the 100-meter long field, the total amount of solar energy received would be 239 kW in mid winter, which is only about 7% more than the solar trough that covers the same amount of land. In the summer, the solar dish row would still receive 239 kW of solar energy, but the trough would receive 395 kW. So, for the same amount of land coverage, the troughs would receive much more solar energy. Of course, we must also consider how efficiently each collector transforms the energy into heat in the fluid that flows through it.

As a comparison between Suntrof and standard parabolic solar troughs, Table 1 gives computer ray-trace calculations of efficiency for both types of solar collectors.

TABLE 1

Efficiency comparison between Suntrof and regular parabolic trough solar collectors as a function of temperature and degrees off center (sun-tracking accuracy).

| Temperature (Degrees C.) | Degrees Off Center | Efficiency of Suntrof (%) | Efficiency of Solar Troughs (%) |
|---|---|---|---|
| 250 | 0 | 85.6 | 85.5 |
| 250 | 2 | 77.7 | 46.3 |
| 250 | 3 | 59.9 | 0.0 |
| 400 | 0 | 77.7 | 77.2 |
| 400 | 2 | 69.0 | 38.3 |
| 400 | 3 | 50.8 | 0.0 |
| 500 | 0 | 68.3 | 67.6 |
| 500 | 2 | 59.3 | 28.8 |
| 500 | 3 | 41.4 | 0.0 |
| 600 | 0 | 54.9 | 53.3 |
| 600 | 2 | 46.0 | 15.1 |
| 600 | 3 | 28.2 | 0.0 |
| 700 | 0 | 35.5 | 33.8 |
| 700 | 2 | 26.1 | 0.0 |
| 700 | 3 | 6.5 | 0.0 |

If the collector is pointed directly at the sun so that the sunlight is focused on the fluid pipe (containing the heat-collecting fluid), the "degrees off center" is zero. The degrees off center refers to the east-west tracking accuracy, not the north-south position of the sun. The efficiency represents the amount of heat delivered to the fluid compared to the sunlight that is incident on the reflector. In both cases, the collector aperture is two meters wide. However, the dimensions may be scaled up to any size with the same results in efficiency.

Note that the efficiency of both types of solar concentrators drops off as the degrees off center increases, but the efficiency of the regular solar trough drops off faster. In fact, when the regular solar collector is pointed three degrees off dead center of the sun it focuses zero energy onto the fluid pipe for all cases considered in the table.

At higher temperatures, the efficiency drops off, because there is greater radiation from the fluid pipe.

For high temperatures, dish or Suncone collectors have higher efficiency than troughs. Suntrof collectors have higher efficiency, are less expensive, and need less tracking accuracy than regular troughs.

Fabrication

The ribs are constructed with a parabolic shape for the inside surface. Two ribs are bolted together at the bottom to form the ribs on each side. The ribs can be assembled to the trough support system in the field, and then the tracking arches can be attached.

After the fluid pipe with its glass enclosing tube is emplaced and the ribs are connected, the unit is tilted down to one side, and a sheet of reflecting film is placed in the lowered ribs, stretched horizontally, and cemented to the ribs. If desirable, a strip of plastic material can be used to press the film against the rib, and the strip can be bolted in place by bolts that extend through the plastic film into the rib.

After that reflective film is in place, the unit is rotated the opposite direction, and a reflective sheet is placed in the other half, tightened, and cemented in place. The two sheets are sealed together at the bottom. Then the protective enclosing outer film is attached on the outside of the ribs as tension is applied. This protective film prevents the wind from affecting the reflective film.

The frame structure on the ends of the Suntrof modules must be robust enough to sustain the tension of the plastic sheets and the guy wires. End guy wires supply the force to counteract the plastic sheet tension. The lower end of the guy wires are attached to an anchor at a point that is in line with the pivot line (center of the fluid pipe).

Figure 7:
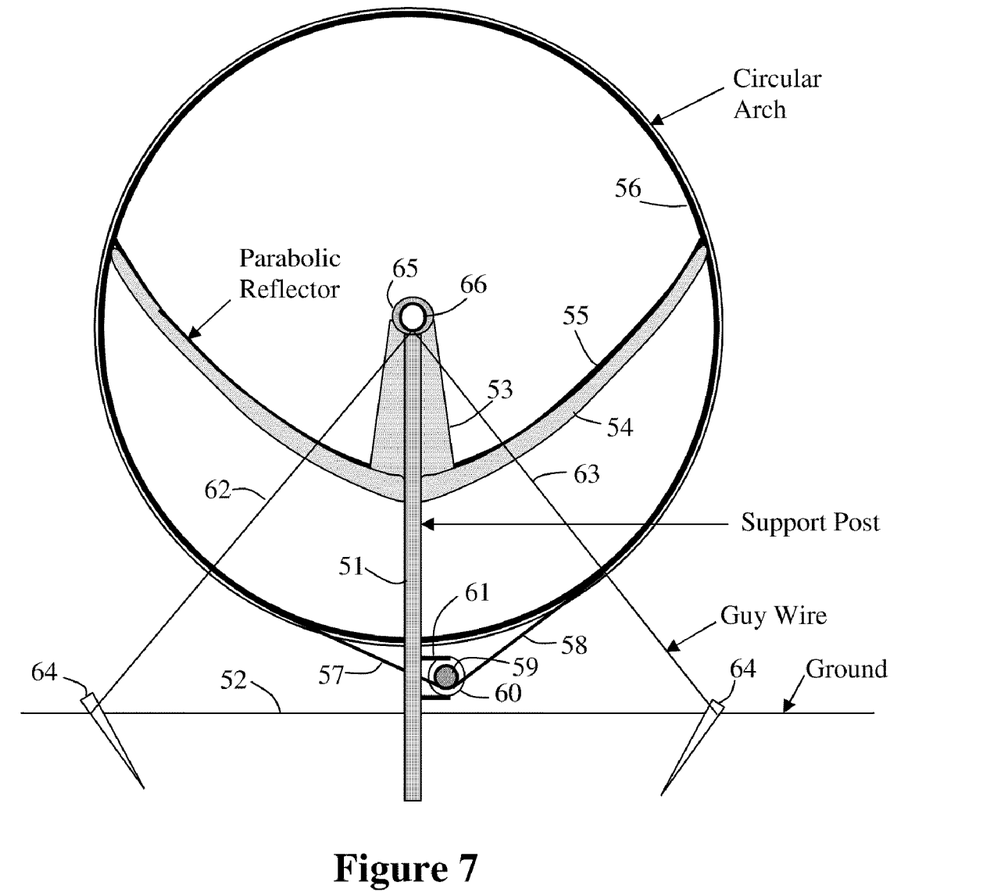
FIG. 7 is an end view of one embodiment of a Suntrof module showing a tracking system that incorporates tracking cables running from a circular tracking arch to a tracking pipe attached to the trough support posts.

FIG. 7 shows another method of providing sun tracking and rotational rigidity for the Suntrof. The figure is an end view of one Suntrof module. One Suntrof row consists of a number of modules placed end-to-end.

One advantage of the embodiment shown in FIG. 7 is that by anchoring the tracking pipe to the lower part of the support post, fewer foundations in the ground are required. It uses high leverage like the other embodiments of this invention, but in this case, the tracking arch is a complete circle. The support post 51 for the trough is inserted into the ground 52 and supports the connection assembly 53, which supports the ribs 54 and bearing 65, which holds the fluid pipe 66. The ribs 54 support the parabolic reflector 55 and the circular tracking arch 56. The tracking arch has at least one groove on the outer circumference into which the tracking cables 57 and 58 are placed.

The tracking cables 57 and 58 are wrapped around the tracking pipe 59, which is driven by a tracking motor (not shown). Alternatively, a cable drum can be attached to the outside of the tracking pipe, and the cables 57 and 58 can be wrapped around the cable drum. The tracking pipe extends along a row of Suntrof modules. The trough row may consist of a number of modules. The tracking pipe is supported by bearings 60 that are attached to support posts of the modules by connectors 61.

The tracking pipe, along with the tracking cables and the tracking arches, provide for the rotation of the Suntrof modules to follow the sun and also provides rotational rigidity to the Suntrof modules. There is one tracking arch on each end of a Suntrof module, and each arch has its own tracking cables that go to the tracking pipe. As the tracking pipe 59 rotates clockwise in the drawing, it draws in tracking cable 58 and lets out tracking cable 57. This causes the tracking arch to rotate clockwise, and that causes the trough to rotate clockwise. When the tracking pipe rotates counterclockwise, in a similar manner, the trough is caused to rotate counterclockwise.

Tracking cable 57 should extend clockwise around the tracking arch sufficiently far so that the trough can be turned upside down for protection during severe weather. Similarly, tracking cable 58 should extend sufficiently far counterclockwise around the arch to rotate the trough upside down in the opposite direction. The tracking cables are attached to the tracking arch with an adjustable attachment so that the cable tension and the trough alignment can be adjusted.

Each support post 51 is placed between two Suntrof modules, except on the ends of the rows, where the support post has a module only on one side of it.

To further reduce the weight of a solar trough system, Suntrof uses other cables to provide high leverage. In FIG. 7, guy wires 62 and 63 provide high leverage to the top of the support post 51. The guy wires 62 and 63 are attached to stakes 64. By using the guy wires, the support post can be lighter weight, and the foundation in the ground does not have to be as massive. At the ends of each row of modules, an extra guy wire extends from the top of the last support post in the direction of the trough axis down to the ground to provide support for winds coming from that direction.

Figure 8:
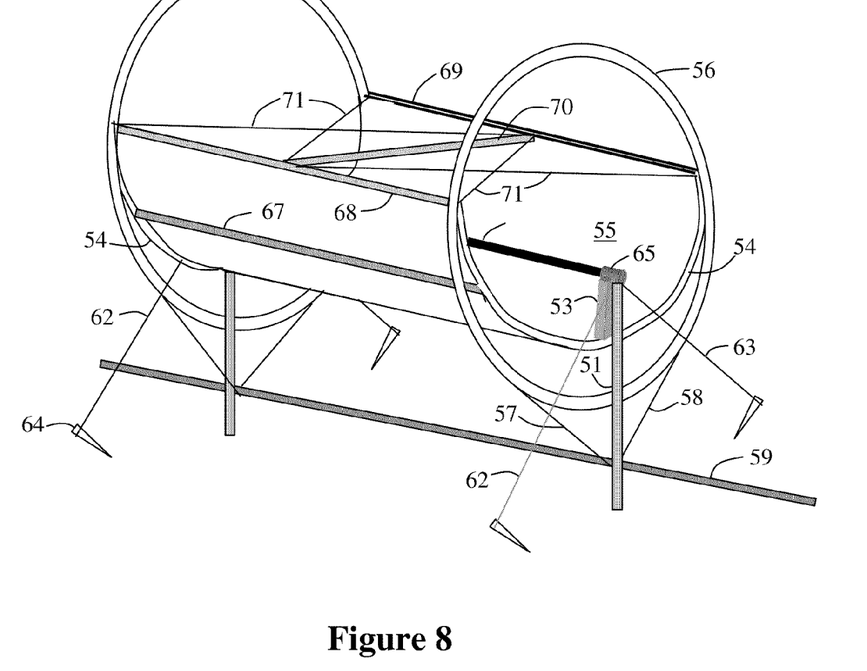
FIG. 8 is an isometric drawing of a Suntrof module illustrating the longitudinal beams, the beam across the top, and the diagonal cables across the top.

In FIG. 8, which is an isometric drawing of a Suntrof module, a plurality of longitudinal beams 67, 68 and 69 extend from a rib 54 on one end of the module to a rib on the other end. There is also longitudinal beams at the bottom of the trough and on the opposite side of the trough across from beam 67, but they are not visible in FIG. 8. Additional longitudinal beams may be added if necessary. In order to increase the rigidity of the trough module along the length of the module, beam 70 is connected across the top of the trough from the center of beam 68 to a similar beam 69 on the opposite side. Then diagonal wires 71 (or cables) are connected from the tops of the ribs 54 to the ends of beam 70.

Figure 9:
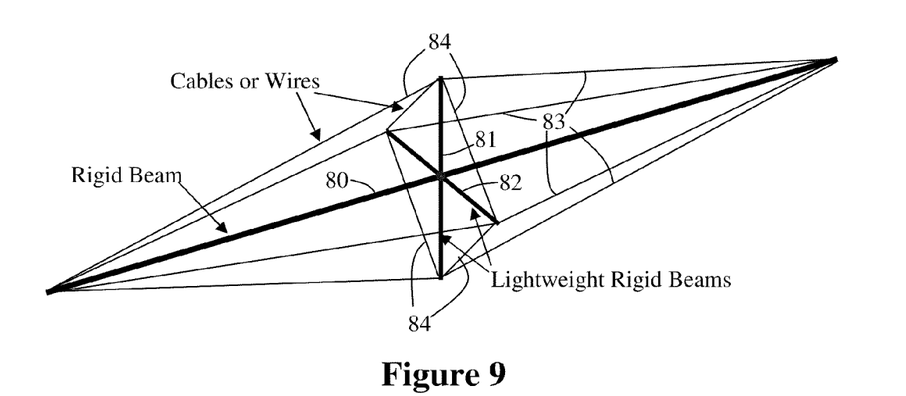
FIG. 9 illustrates the construction of an X-Beam.

If it is necessary to make the longitudinal beams 67, 68, and 69 and beam 70 stronger without significantly increasing weight, they can be constructed as shown in FIG. 9. I call it an "X-Beam." The bottom longitudinal beam of the trough, which was mentioned in the previous paragraph and which is not visible in FIG. 8, should be constructed as an X-Beam to support the weight of the trough and to support the trough against wind forces. In FIG. 9, beam 80 is the main beam. It can be an I-Beam, a pipe, or other types of beam. By placing lightweight beams 81 and 82 in an X configuration attached to the center of beam 80 and attaching cables or wires 83 from the ends of beams 81 and 82 to the opposite ends of beam 80, the structure is made more rigid. Beams 81 and 82 are perpendicular to each other and perpendicular to beam 80. To make the structure more rigid, cables or wires 84 can be attached to the ends of beams 81 and 82.

Figure 10:
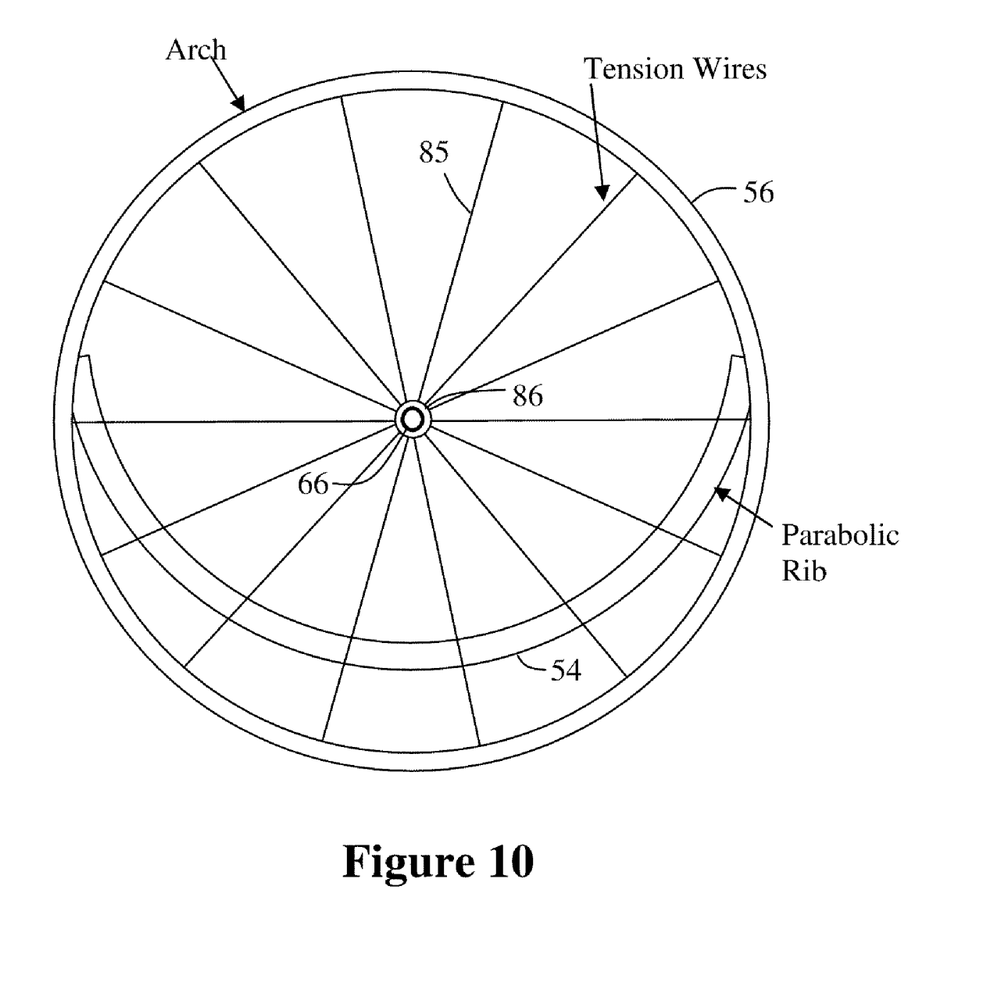
FIG. 10 shows a method of making the circular arch rigid by attaching wires at points around the arch.

In order to make the tracking arch 56 rigid and yet lightweight, FIG. 10 shows a simple method. Tension wires 85 can be attached to points around the arch, like spokes on a bicycle wheel. The tension wires can be attached to a hub 86 that surrounds the fluid pipe 66. Since the wires are in tension, they tend to make the arch 56 remain circular and thus rigid. Alternatively, the tension wires that are attached to the top half of the tracking arch 56 can bypass the hub 86 and be attached to points on the rib 54 and continue on in a straight manner to the lower part of the arch 56.

In accordance with the foregoing, there is provided an alternative embodiment of the solar energy collection system which includes a set of rigid ribs 54 spaced apart along the length of the solar energy collection system, each of the ribs having an inner surface defining an approximate parabolic curvature. There is a set of connection assemblies 53 to which the rigid ribs 54 are connected, and a set of anchored support posts 51 that are rotatably connected to corresponding ones of the connection assemblies to lend support to the connection assemblies 53 and the ribs 54. A reflective member 55 is attached to the inner surfaces of the ribs and thus has a curvature approximating the curvature of the inner surface of the rigid ribs 54. The reflective parabolic member 55 thus defines a reflective trough with a parabolic cross-section, which reflects sunrays to the parabola's focal line, generally according to the embodiments previously disclosed hereinabove.

In this alternative embodiment, however, a set of circular tracking arches 56 is connected to the rigid ribs 54, for providing rotational rigidity to the overall solar energy collection system and for pointing the solar energy collection system toward the sun. A set of tracking cables 57, 58, is attached to the circular tracking arches for rotating the circular arches and the solar energy collection system. Optionally but preferably, at least one groove is defined on the outer circumference of the circular tracking arch 56 for receiving one or more of the tracking cables 57, 58, and into which one or more of the tracking cables are attached.

As with other versions of the apparatus, a fluid pipe is disposed at the focal line of the parabolic trough, which fluid pipe 66 carries a flowing fluid to absorb the heat of the solar energy entering the trough and incident on the fluid pipe 66. As mentioned, there also is provided in this embodiment a control system for moving (as, for example, by retracting and letting out, i.e., winding upon and paying out) the tracking cables 57, 58, to controllably rotate the overall solar energy collection system to point or aim toward the sun, that is, so that the sun's energy is gathered through the aperture of the parabolic trough. The control system moves the tracking cables 57, 58, preferably generally in unison, to rotate the solar energy collection system toward the sun so that the sunlight striking the reflective member 55 is reflected to the fluid pipe 66, which heats the flowing fluid within the fluid pipe. The tracking cables 57, 58, the circular tracking arches 56, and the control system provide rotational rigidity for the overall solar energy collection system.

The control system preferably includes a tracking pipe 59 rotatably connected to a lower part of a support post 51. The tracking pipe 59 is rotationally controlled by a sun-tracking control system, and the tracking cables 57, 58 are wound or "wrapped" around the tracking pipe 59 so that when the tracking pipe rotates, a tracking cable (e.g., cable 57) attached to one side of the circular tracking arch 56 is retracted, and a tracking cable (e.g., cable 58) attached to the other side of the circular tracking arch 56 is let out, thereby rotating the circular tracking arch 56 (and thus rotating the solar energy collection system). The simultaneous rotation of all the circular arches 56 of the solar energy collection system provides rotational rigidity to the system. In one embodiment, the solar energy collection system is assembled from a set of modules, each of which has a circular tracking arch 56 on each end thereof, and wherein the modules are placed end-to-end, and adjacent modules share a common support post.

Guy wires 62, 63 preferably are attached to the tops of the support posts 51 to provide highly leveraged rigidity to stabilize the support posts. As seen in the drawing figure, the guy wires 62, 63 extend outward from points adjacent the center or focal line of the trough, are perpendicular to the focal line of the trough, and extend at an angle down to an anchor point (e.g., the ground where they are anchored to the ground).

As described above with reference to FIG. 8, at least three longitudinal beams 67, 68, 69 extend horizontally from a rib 54 on one end of each module to a rib on the other end of the module. Two longitudinal beams preferably are disposed along respective top edges of the reflective member 55, while one longitudinal beam preferably is disposed along the bottom of the trough. These longitudinal beams provide support for the reflecting member 55. Optionally, a cross beam 70 extends intermediately across the mouth opening of the trough, preferably about halfway between the rib 54 on one end of each module and the rib on the other end of each module, thus providing rigidity to the central part of the module. The cross beam 70 is attached to two longitudinal beams (preferably near the centers of the respective longitudinal beams) disposed along the top edges of the trough. Optionally but preferably, wires or cables 71 extend diagonally from the tops of the ribs 54, across the mouth of the trough, to the ends of the cross beam 70 as seen in FIG. 8.

Having combined reference again to FIGS. 8 and 9, at least one of the longitudinal beams 67-69 may be constructed in a manner to make it stronger, yet lightweight, by fabricating it in an "X-Beam." Such an X-Beam longitudinal beam features a main longitudinal beam 80, and two short beams 81, 82, attached to the center of the main longitudinal beam 80, preferably such that the two short beams are perpendicular to each other and perpendicular to the main longitudinal beam 80. Preferably further, cables 83 are attached between each end of the longitudinal beam 80 and the ends of each of the short beams 81 and 82. Cables 84 preferably also are attached between the ends of each short beam 81 or 82, and the ends of the other short beam 82 or 81. The cross beam 70 likewise may be constructed in a manner to make it stronger by fabricating it of "X-Beam components: a main cross beam 80; two short beams 81, 82 attached to the center of the main cross beam 80 such that the two short beams are perpendicular to each other and perpendicular to the main cross beam; cables attached between each end of the cross beam and the ends of the short beams; and cables attached between the ends of each short beam and the ends of the other short beam.

Returning reference again to FIG. 10, the system according to this disclosure may further feature tight cables 85, attached at a plurality of points on each circular tracking arch 56 and extending radially inward to the hub 86 disposed around the fluid pipe 66. Such cables or wires 85 rigidize the circular arch 56. Alternatively, the tension wires that are attached to the top half of the tracking arch 56 can bypass the hub 86 and be attached to points on the rib 54 and continue on in a straight manner to the lower part of the arch 56.

What is claimed is:

1. A solar energy collection system comprising:
   a set of rigid ribs spaced apart along the length of the solar energy collection system, each of which rigid ribs has an inner surface defining an approximate parabolic curvature;
   a set of connection assemblies to which the rigid ribs are connected;
   a set of anchored support posts rotatably connected to corresponding said connection assemblies to support the connection assemblies and the rigid ribs;
   a reflective member, attached to the inner surface of the rigid ribs, for reflecting sunrays to a focal line, the reflective member having a curvature approximating the curvature of the inner surface of the rigid ribs thereby defining a reflective trough having a parabolic cross section, for reflecting sun rays to the focal line;
   a set of circular tracking arches, connected to the rigid ribs, for making the solar energy collection system rotationally rigid;
   a set of tracking cables attached to the circular tracking arches for rotating the circular arches and the solar energy collection system;
   a control system for moving the tracking cables to controllably rotate the solar energy collection system to point toward the sun;
   a fluid pipe, at the focal line, for carrying a flowing fluid to absorb the heat of solar energy incident on the fluid pipe; and
   guy wires attached to tops of the support posts to provide leveraged rigidity to stabilize the support posts, wherein the guy wires extend outward from adjacent the focal line of the trough, are perpendicular to the focal line of the trough, and extend at an angle down to an anchor point;
   wherein the control system moves the tracking cables to rotate the solar energy collection system toward the sun so that the sunlight striking the reflective member is reflected to the fluid pipe, which heats the flowing fluid within the fluid pipe, and wherein the tracking cables, the circular tracking arches, and the control system provide rotational rigidity for the solar energy collection system, and
   wherein the solar energy collection system comprises a set of modules, each of which has a circular tracking arch on each end thereof, and wherein the modules are placed end-to-end, and adjacent modules share a common support post.

2. The solar energy collection system according to claim 1, wherein the control system comprises a tracking pipe rotatably connected to a lower part of a support post, and wherein the tracking pipe is rotationally controlled by a sun-tracking control system, and tracking cables are wrapped around the tracking pipe so that when the tracking pipe rotates, a tracking cable attached to one side of a circular tracking arch is retracted, and a tracking cable attached to the other side of the circular tracking arch is let out, thereby rotating the circular tracking arch, and thus rotating the solar energy collection system.

3. A solar energy collection system comprising:
   a set of rigid ribs spaced apart along the length of the solar energy collection system, each of which rigid ribs has an inner surface defining an approximate parabolic curvature;
   a set of connection assemblies to which the rigid ribs are connected;
   a set of anchored support posts rotatably connected to corresponding said connection assemblies to support the connection assemblies and the rigid ribs;
   a reflective member, attached to the inner surface of the rigid ribs, for reflecting sunrays to a focal line, the reflective member having a curvature approximating the curvature of the inner surface of the rigid ribs thereby defining a reflective trough having a parabolic cross section, for reflecting sun rays to the focal line;
a set of circular tracking arches, connected to the rigid ribs, for making the solar energy collection system rotationally rigid;
a set of tracking cables attached to the circular tracking arches for rotating the circular arches and the solar energy collection system;
a control system for moving the tracking cables to controllably rotate the solar energy collection system to point toward the sun;
a fluid pipe, at the focal line, for carrying a flowing fluid to absorb the heat of solar energy incident on the fluid pipe; and
tight cables, attached at a plurality of points on the upper half of each circular tracking arch and extending inward past a hub disposed around the fluid pipe, and extending to attachment points on a rigid rib and extending further to attachment points on the lower part of the circular tracking arch, for holding rigid the circular arch;
wherein the control system moves the tracking cables to rotate the solar energy collection system toward the sun so that the sunlight striking the reflective member is reflected to the fluid pipe, which heats the flowing fluid within the fluid pipe, and wherein the tracking cables, the circular tracking arches, and the control system provide rotational rigidity for the solar energy collection system.

4. The solar energy collection system according to claim 3, wherein the control system comprises a tracking pipe rotatably connected to a lower part of a support post, and wherein the tracking pipe is rotationally controlled by a sun-tracking control system, and tracking cables are wrapped around the tracking pipe so that when the tracking pipe rotates, a tracking cable attached to one side of a circular tracking arch is retracted, and a tracking cable attached to the other side of the circular tracking arch is let out, thereby rotating the circular tracking arch, and thus rotating the solar energy collection system.

5. The solar energy collection system according to claim 3, wherein the solar energy collection system comprises a set of modules, each of which has a circular tracking arch on each end thereof, and wherein the modules are placed end-to-end, and adjacent modules share a common support post.

6. The solar energy collection system according to claim 5, further comprising guy wires attached to tops of the support posts to provide leveraged rigidity to stabilize the support posts, and wherein the guy wires extend outward from adjacent the focal line of the trough, are perpendicular to the focal line of the trough, and extend at an angle down to an anchor point.

7. The solar energy collection system according to claim 5, wherein at least three longitudinal beams extend from a rigid rib on one end of each module to a rigid rib on the other end of the module, wherein two of said longitudinal beams are disposed along the top edges of the reflective member, one said longitudinal beam is disposed along the bottom of the trough, wherein the longitudinal beams provide support for the reflecting member.

8. The solar energy collection system according to claim 5, further comprising a cross beam extending intermediately across the trough between a rigid rib on one end of each module and a rigid rib on the other end of each module to provide rigidity to the central part of the module, and wherein the cross beam is attached to two longitudinal beams disposed along the top edges of the trough, and further comprising cables extending diagonally from the tops of the rigid ribs across the trough to the ends of the cross beam.

9. The solar energy collection system according to claim 7, wherein at least one of the longitudinal beams comprises;
a main longitudinal beam;
two short beams attached to the center of the main longitudinal beam, wherein the two short beams are perpendicular to each other and perpendicular to the main longitudinal beam;
cables attached between each end of the longitudinal beam and the ends of each of the short beams; and
cables attached between the ends of each short beam and the ends of the other short beam.

10. The solar energy collection system according to claim 8, wherein the cross beam comprises:
a main cross beam;
two short beams attached to the center of the main cross beam wherein the two short beams are perpendicular to each other and perpendicular to the main cross beam;
cables attached between each end of the cross beam and the ends of the short beams; and
cables attached between the ends of each short beam and the ends of the other short beam.

11. A solar energy collection system comprising a set of modules, each of which has a circular tracking arch on each end thereof, and wherein the modules are placed end-to-end, and adjacent modules share a common support post, and further comprising:
rigid ribs spaced apart along the length of the solar energy collection system, each of which rigid ribs has an inner surface defining an approximate parabolic curvature;
connection assemblies to which the rigid ribs are connected;
anchored support posts rotatably connected to corresponding ones of said connection assemblies to support the connection assemblies and the rigid ribs;
a reflective member, attached to the inner surfaces of the rigid ribs, for reflecting sunrays to a focal line, the reflective member having a curvature approximating the curvature of the inner surfaces of the rigid ribs thereby defining a reflective trough having a parabolic cross section, for reflecting sun rays to the focal line;
a tracking system comprising:
the circular tracking arches extending in a complete circle around the rigid ribs, each tracking arch being connected to a corresponding rigid rib; and
tracking cables attached to and placed at least partially around the circumferences of the circular tracking arches for imparting a rotary force to the arches to rotate the solar energy collection system, wherein each tracking cable extends sufficiently around a tracking arch such that that the trough is rotatable by the tracking cables to an upside down position;
a control system for moving the tracking cables to controllably rotate the solar energy collection system;
a fluid pipe, at the focal line, for carrying a flowing fluid to absorb the heat of solar energy incident on the fluid pipe; and
at least three longitudinal beams extend from a rigid rib on one end of each module to a rigid rib on the other end of the module, wherein two of said longitudinal beams are disposed along the top edges of the reflective member, one said longitudinal beam is disposed along the bottom of the trough, wherein the longitudinal beams provide support for the reflecting member, and wherein at least one of the longitudinal beams comprises;

a main longitudinal beam;
two short beams attached to the center of the main longitudinal beam, wherein the two short beams are perpendicular to each other and perpendicular to the main longitudinal beam;
cables attached between each end of the longitudinal beam and the ends of each of the short beams; and
cables attached between the ends of each short beam and the ends of the other short beam;
wherein the control system moves the tracking cables to rotate the solar energy collection system toward the sun so that the sunlight striking the reflective member is reflected to the fluid pipe, which heats the flowing fluid within the fluid pipe, and wherein the tracking cables, the circular tracking arches, and the control system provide rotational rigidity for solar energy collection system; and
wherein said tracking system provides rotational rigidity to the reflective trough, and wherein said tracking cables are movable generally in unison by said control system to rotate simultaneously all the tracking arches, thereby to maintain said rotational rigidity.

* * * * *